Nov. 19, 1968   A. KREUZ   3,411,813
SELF-CENTERING, COAXIAL SHAFT COUPLING
Filed June 7, 1966
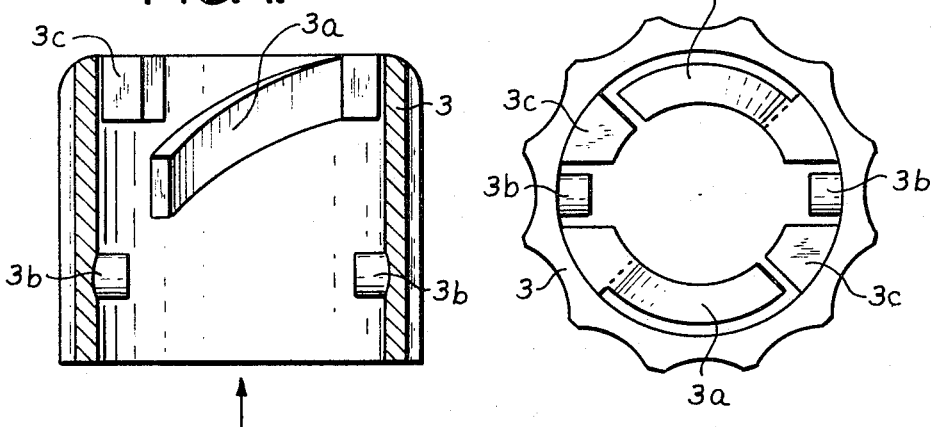
FIG. 1.
FIG. 2.
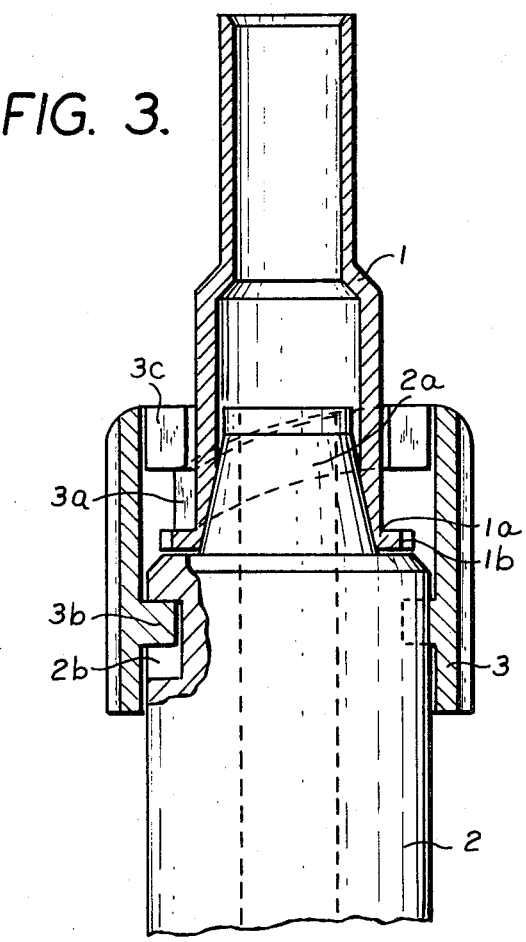
FIG. 3.
INVENTOR
ALOIS KREUZ
BY
Ernest G. Montague
ATTORNEY.

3,411,813
SELF-CENTERING COAXIAL
SHAFT COUPLING
Alois Kreuz, Dornigheim, Germany, assignor to VDO Tachometer Werke Adolf Schindling G.m.b.H., Frankfurt am Main, Germany, a corporation of Germany
Filed June 7, 1966, Ser. No. 555,847
Claims priority, application Germany, July 3, 1965, V 28,793
3 Claims. (Cl. 285—332)

ABSTRACT OF THE DISCLOSURE

A socket connection between the connecting branch of a speedometer and the cylindrical end sleeve of a protection sheath of the flexible drive shaft, which comprises a cylindrical end sleeve having a radially outwardly extending collar at its free end, and a connecting branch adapted to form the end portion of a speedometer. A retaining cap is resiliently secured to the connecting branch by means of bayonet lock means, and the retaining cap has integral elastic tongues. The latter secure the end sleeve resiliently to the connecting branch, and are disposed inside of the retaining cap along a helical line, surrounding annularly the end sleeve and engaging an outer collar of the end sleeve.

---

The present invention relates to a socket connection between the connecting branch of a speedometer and the cylindrical end sleeve of the protection hose of the flexible drive shaft of the speedometer.

The end sleeve or terminal sleeve is generally firmly screwed onto the connecting branch by means of a retaining cap. Since this work is time consuming and frequently very cumbersome due to poor accessibility of the connecting branch, it has already been proposed, to fasten the retaining cap to the connecting branch by means of a bayonet lock. A coil spring arranged within the retaining cap serves thereby to secure the bayonet lock. This known type of fastening is, however, too demanding and correspondingly expensive and could therefore not be accepted into practice. The use coil spring has furthermore the disadvantage, that it can transmit disturbing noises of the drive shaft. Also special measures are required, in order to retain the coil spring in the screw cap, without danger of losing the same.

It is one object of the present invention to provide a socket connection between the connecting branch of a speedometer and the end sleeve of the protection hose of the flexbile drive shaft of the speedometer, which permits with little expense a rapid, easy connecting of the flexible drive shaft. Any noise formation at the point of connection should also be avoided.

It is another object of the present invention to provide a socket connection between the connecting branch of a speedometer and the end sleeve of the protection hose of the flexible drive shaft of the speedometer, wherein the retaining cap has elastic tongues formed on it, which hold the end sleeve resiliently against the connecting branch. In accordance with the present invention the resilient tongues are disposed inside of the retaining cap and surround circularly the end sleeve, in order to center the tongues in the cap. The spring tongues engage thereby an outer collar of the terminal sleeve. In order to obtain a precise coaxial connection between the speedometer and the protection sheathing or sleeve of its flexible drive shaft, the end sleeve is seated conically on a conical protrusion of the connection branch, in accordance with another feature of the present invention. The essential advantage of the present invention resides in the fact, that the mounting work upon assembly and disassembly of speedometers of automotive vehicles or upon replacement of the flexible drive shaft is reduced, and the retaining cap, designed in accordance with the present invention, with the spring tongues can be made economically integrally of synthetic material. It contributes thereby also to the abating of the noise formation during the speedometer operation. A cap of synthetic material is unsuitable for the conventional screw connections, since the thread would not withstand the stresses occurring at the connecting point.

With these and other objects in view which will become apparent from the following detailed description, the present invention will be clearly understood in connection with the accompanying drawing, in which:

FIG. 1 is an axial section of the retaining cap;

FIG. 2 is a bottom plan view of the retaining cap disclosed in FIG. 1; and

FIG. 3 is an elevation of the socket connection partly in section.

Referring now to the drawing, the socket connection comprises an end sleeve 1 of the protective tubing of the flexible drive shaft (not shown), which end sleeve 1 has its outwardly conically widened opening sitting on a conical extension 2a of a connecting branch 2 of the speedometer and is pressed firmly on its seat by retaining or enveloping cap 3 of synthetic material for securing the conventional socket connection between the speedometer and its drive shaft. For this purpose the retaining cap 3 has at its upper edge two elastic tongues 3a, as well as at its inner edge radially inwardly directed and diametrically oppositely disposed pins 3b, formed thereon, which pins 3b can engage, in the manner of a bayonet lock, complementary lateral recesses 2b of the connecting branch 2. These elastic tongues 3a are arranged axially symmetrical relative to each other, surround annularly the end sleeve 1 and extend along a helical line axially into the retaining cap 3. Their free ends lie resiliently against an outer collar 1a of the end sleeve 1. By means of the tongues 3a, as well as centering extensions 3c extending radially inwardly at the upper edge of the retaining cap 3, the latter is rotatably mounted on the end sleeve 1. It is held in non-losable manner on the end sleeve 1 even, when the drive shaft is not connected to the speedometer, since the collar 1a of the end sleeve 1 is freely movable only between the tongues 3a and the pins 3b. In order that the retaining cap 3 can slide onto the end sleeve 1, narrow radial recesses 1b corresponding to the pins 3b are provided, however, in its collar 1a.

The retaining cap 3 is fastened to the connecting branch 2 in known manner, in that the pins 3b are introduced under the tension of the resilient tongues 3a, resting against the collar 1a, into the recesses 2b and after turning of the cap engage in widened portions of the recesses.

While I have disclosed one embodiment of the present invention, it is to be understood that this embodiment is given by example only and not in a limiting sense, the scope of the present invention being determined by the objects and the claims.

I claim:

1. A retaining cap for a socket connection between the connecting branch of a speedometer and the cylindrical end sleeve of a protection sheath of a flexible drive shaft, comprising:
    a cylindrical cap member having radially inwardly directed and diametrically oppositely disposed pins arranged intermediate its ends and being secured at one of its ends adjacent the upper end of said cap member and extending axially inwardly and received in complementary lateral recesses of a connecting branch,
    said retaining cap member including at least one integral elastic tongue, the latter being disposed in a cantilevered manner along a helical line inside of said retaining cap member, an end sleeve having at one end thereof a radially outwardly extending collar, and cooperating means on said sleeve and said branch to prevent radial and axial movement of said sleeve relative to said branch, said elastic tongue acting against said collar, to secure said end sleeve resiliently to said connecting branch.

2. The retaining cap, as set forth in claim 1, wherein: said cylindrical cap member has at its upper edge radially inwardly extending centering extensions, in order to mount rotatably said cylindrical cap member on said end sleeve.

3. The retaining cap, as set forth in claim 1, wherein said cooperating means comprises:

two cooperating members, one of said members constituting said end sleeve and the other of said members constituting said connecting branch, and one of said members has an outwardly conically widened opening sitting on a conical extension of the other of said members.

References Cited

UNITED STATES PATENTS

| 1,089,650 | 3/1914 | Kile | 285—332 X |
| 1,581,559 | 4/1926 | Williams | 151—38 |
| 1,899,119 | 2/1933 | Singer | 285—360 X |
| 2,101,345 | 12/1937 | Riley | 339—187 |

FOREIGN PATENTS

| 28,932 | 12/1911 | Great Britain. |

CARL W. TOMLIN, *Primary Examiner.*

WAYNE L. SHEDD, *Assistant Examiner.*